(12) United States Patent
Ko

(10) Patent No.: US 8,428,046 B2
(45) Date of Patent: Apr. 23, 2013

(54) WIRELESS NETWORK ACCESS DEVICE WITH POSITIONING FUNCTION AND METHOD THEREOF

(75) Inventor: Chun-Liang Ko, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 159 days.

(21) Appl. No.: 13/163,744

(22) Filed: Jun. 20, 2011

(65) Prior Publication Data

US 2012/0263050 A1    Oct. 18, 2012

(30) Foreign Application Priority Data

Apr. 14, 2011    (CN) .......................... 2011 1 0093365

(51) Int. Cl.
*H04L 12/28*    (2006.01)
(52) U.S. Cl.
USPC ........................................ 370/351; 455/456.1
(58) Field of Classification Search ........................ None
See application file for complete search history.

(56) References Cited

U.S. PATENT DOCUMENTS

| | | | |
|---|---|---|---|
| 2003/0117320 A1* | 6/2003 | Kim et al. | 342/457 |
| 2004/0203779 A1* | 10/2004 | Gabara | 455/436 |
| 2008/0242316 A1* | 10/2008 | Wang et al. | 455/456.2 |
| 2010/0013712 A1* | 1/2010 | Yano | 342/463 |
| 2010/0062739 A1* | 3/2010 | Hozumi et al. | 455/343.1 |
| 2010/0123626 A1* | 5/2010 | Yano | 342/386 |
| 2010/0151789 A1* | 6/2010 | Suzuki et al. | 455/41.2 |
| 2010/0248668 A1* | 9/2010 | Katayama et al. | 455/226.1 |
| 2011/0117922 A1* | 5/2011 | Reitsma | 455/456.1 |

* cited by examiner

*Primary Examiner* — Phirin Sam
(74) *Attorney, Agent, or Firm* — Altis Law Group, Inc.

(57) ABSTRACT

A wireless network access device for positioning a mobile device includes a distance acquiring module, an information receiving module and a position determining module. The distance acquiring module acquires an initial distance between the wireless network access device and the mobile device in an initial position and an intermediate distance between the wireless network access device and the mobile device in an intermediate position. The information receiving module receives a distance, angle and orientation of movement of the mobile device from the initial position to the intermediate position. The position determining module determines a current position of the mobile device according to the received distance, angle and orientation of the mobile device, the initial distance and the intermediate distance.

5 Claims, 3 Drawing Sheets

WIRELESS NETWORK ACCESS DEVICE WITH POSITIONING FUNCTION AND METHOD THEREOF

BACKGROUND

1. Technical Field

The present disclosure relates to wireless network access devices and, particularly, to a wireless network access device with a positioning function and a method thereof.

2. Description of Related Art

To find the position of mobile devices usually takes at least three access points (AP) to acquire coordinates of the mobile devices in a three-dimensional space, and analyze the acquired coordinates of the mobile devices to position the mobile devices. However, the cost of using the access point is high, which results in a high cost for positioning the mobile devices for the user.

Therefore, what is needed is a wireless network access device with a positioning function to overcome the described limitations.

DETAILED DESCRIPTION

Figure 1:
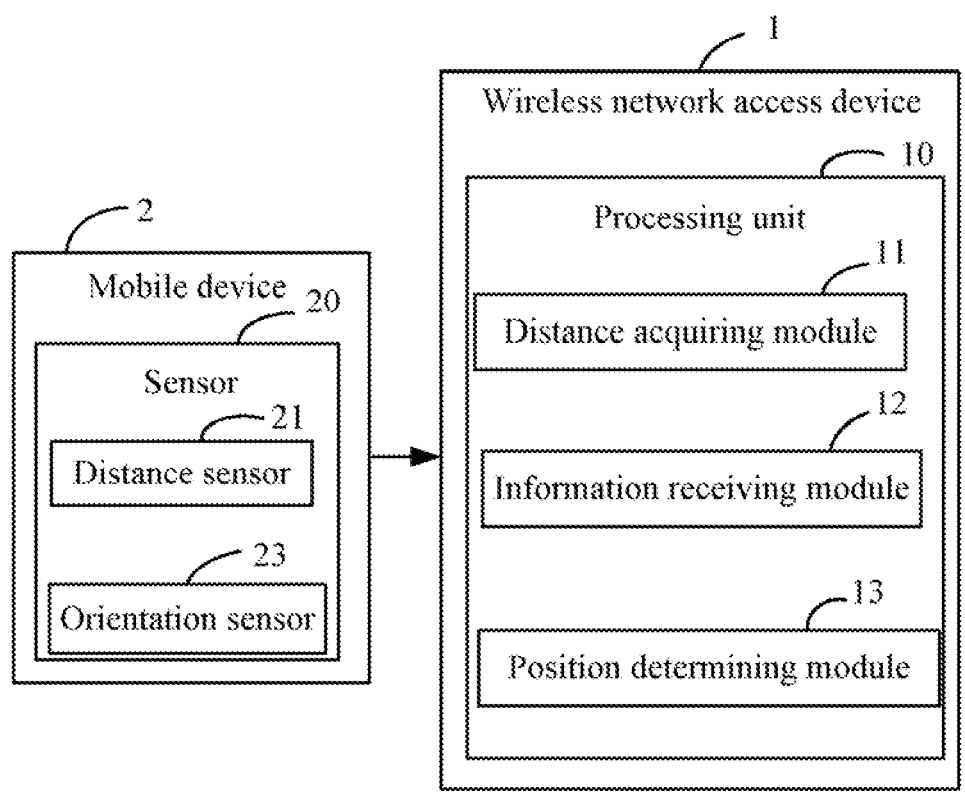
FIG. 1 is a block diagram of a hardware infrastructure of a wireless network access device with a positioning function, in accordance with an exemplary embodiment.
Figure 2:
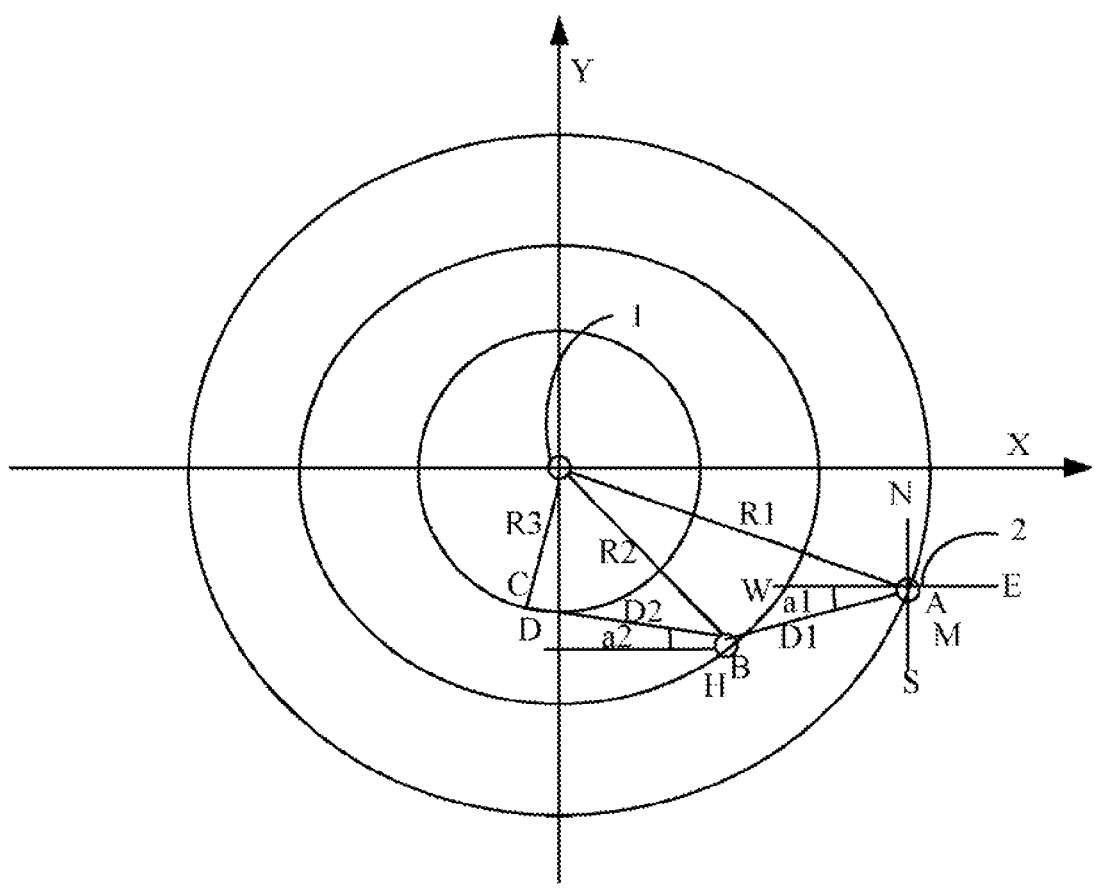
FIG. 2 shows the wireless network access device of FIG. 1 positioning a mobile device.

FIGS. 1-2 shows a wireless network access device 1 with a positioning function. The wireless network access device 1 is configured for positioning a mobile device 2 within a predetermined range. The mobile device 2 can be moved by a user from an initial position (represented by A) to an intermediate position (represented by B). The mobile device 2 includes a sensor 20, which is configured to sense distance (represented by D1), orientation and angle (represented by a1) of a movement of the mobile device 2 from the initial position to the intermediate position. In one embodiment, the sensor 20 includes a distance sensor 21 and an orientation sensor 23. The distance sensor 21 senses the distance of the movement of the mobile device 2 from the initial position to the intermediate position. The orientation sensor 23 senses the orientation and the angle of the movement of the mobile device 2 from the initial position to the intermediate position. In one embodiment, the orientation sensor 23 is an electronic compass. The wireless network access device 1 is a wireless router. The mobile device 2 is further configured for transmitting the sensed distance, orientation and angle of the movement of the mobile device 2 to the wireless network access device 1.

The wireless network access device 1 includes a processing unit 10. The processing unit 10 includes a distance acquiring module 11, an information receiving module 12, and a position determining module 13.

The distance acquiring module 11 is configured to acquire an initial distance (represented by R1) between the wireless network access device 1 and the mobile device 2 in the initial position, and an intermediate distance (represented by R2) between the wireless network access device 1 and the mobile device 2 in the intermediate position. In one embodiment, the distance acquiring module 11 is configured to determine the distance between the wireless network access device 1 and the mobile device 2 according to a received signal strength from the mobile device 2.

The information receiving module 12 is configured to receive the distance, orientation and angle of the movement of the mobile device 2 from the initial position to the intermediate position.

The position determining module 13 is configured to retrieve a number of initial positions (represented by M), which satisfy an initial condition that a distance between the wireless network access device 1 and any one of the plurality of initial positions equals to the initial distance R1 to determine a number of intermediate positions (represented by H), which satisfy an intermediate condition that a distance between the initial position M and the intermediate position H equals to the distance D1 received by the information receiving module 12, an angle from a horizontal line to a line which is formed by connecting the initial position M and the intermediate position H equals to the angle a1 received by the information receiving module 12, an orientation from the initial position M to the intermediate position H is the same as the orientation received by the information receiving module 12, and a distance between the wireless network access device 1 and the intermediate position H equals to the intermediate distance R2 acquired by the distance acquiring module 11.

The position determining module 13 is further configured to determine whether the number of the intermediate positions H is more than one. If the number of the intermediate positions H is more than one, the mobile device 2 is moved from the intermediate position B to another intermediate position (represented by C). The distance acquiring module 11 is further configured to acquire an intermediate distance (represented by R3) between the wireless network access device 1 and the mobile device 2 in another intermediate position C. The information receiving module 12 is further configured to receive the distance (represented by D2), orientation and angle (represented by a2) of the movement of the mobile device 2 from the intermediate position B to another intermediate position C. The position determining module 13 is further configured to take the number of intermediate positions H as the initial positions M to retrieve and to determine a number of new intermediate positions D, which satisfy an intermediate condition that a distance between the intermediate position H and the new intermediate position D equals to the distance D2 received by the information receiving module 12, an angle from a horizontal line to a line which is formed by connecting the intermediate position H to the new intermediate position D equals to the angle a2 received by the information receiving module 12, an orientation from the intermediate position H to the new intermediate position D is the same as the orientation received by the information receiving module 12, and a distance between the wireless network access device 1 and the new intermediate position D equals to the intermediate distance R3 acquired by the distance acquiring module 11. The position determining module 13 is further configured to determine whether the number of the new intermediate positions D is more than one, if yes, repeating the above steps until the number of the new intermediate positions of the mobile device 2, which satisfies the intermediate condition is equal to one. The position determining module 13 determines that the new intermediate position is a current position of the mobile device 2.

Figure 3:
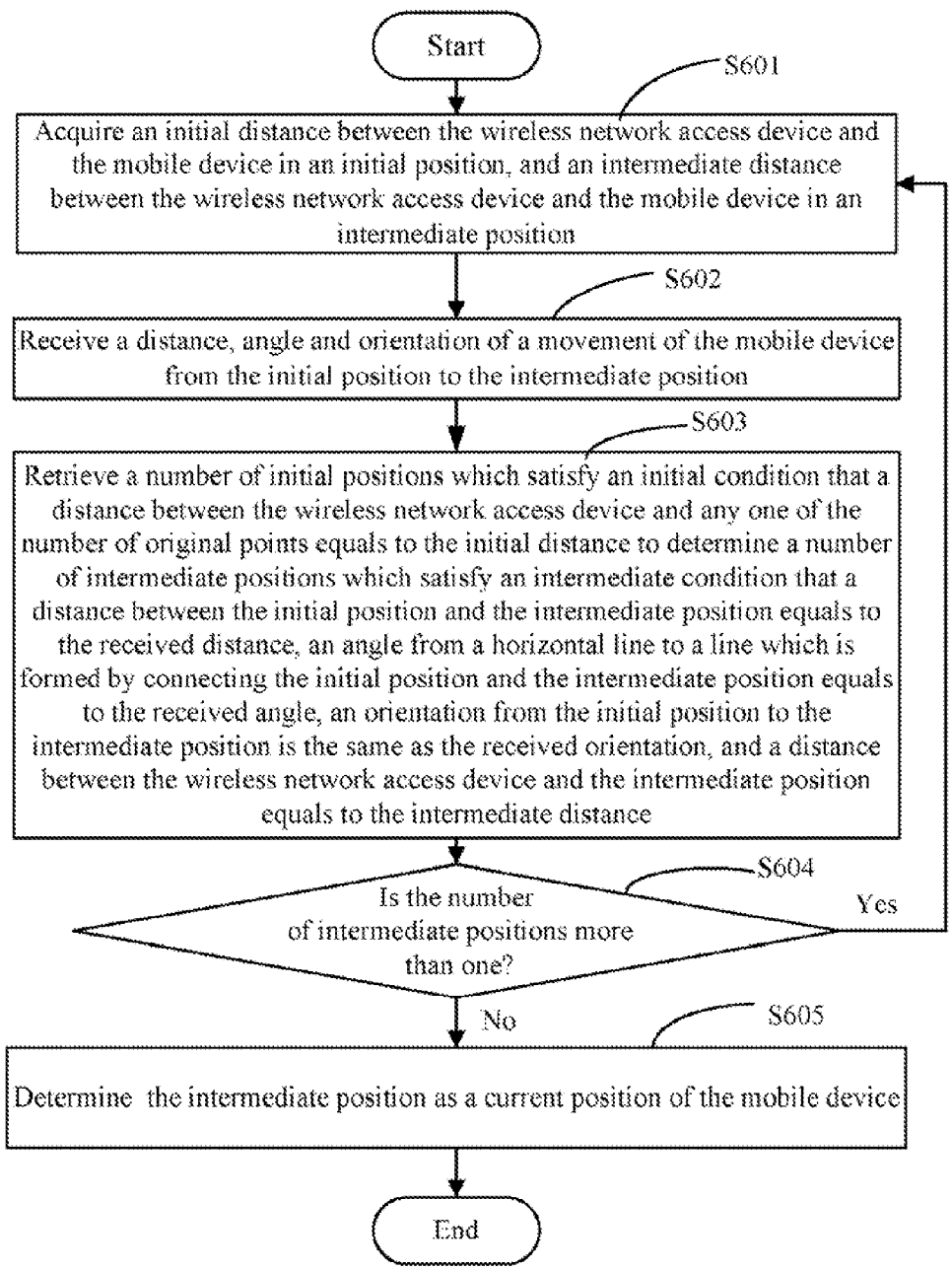
FIG. 3 is a flowchart of a method for positioning a mobile device implemented by the wireless network access device of FIG. 1, in accordance with an exemplary embodiment.

FIG. 3 is a flowchart of a method for positioning a mobile device implemented by the wireless network access device of FIG. 1, in accordance with an exemplary embodiment.

In step S601, the distance acquiring module 11 acquires the initial distance R1 between the wireless network access device 1 and the mobile device 2 in the initial position, and the intermediate distance R2 between the wireless network access device 1 and the mobile device 2 in the intermediate position.

In step S602, the information receiving module 12 receives the distance D1, angle a1 and the orientation of the movement of the mobile device 2 from the initial position to the intermediate position.

In step S603, the position determining module 13 retrieves the number of initial positions which satisfy the initial condition that a distance between the wireless network access device and any one of the plurality of initial positions equals to R1 to determine the number of intermediate positions, which satisfy the intermediate condition that a distance between the initial position and the intermediate position equals to D1, an angle from the horizontal line to the line which is formed by connecting the initial position and the intermediate position equals to a1, an orientation from the initial position to the intermediate position is the same as the orientation received by the information receiving module 12, and a distance between the wireless network access device 1 and the intermediate position equals to R2.

In step S604, the position determining module 13 determines whether the number of the intermediate positions is more than one, if yes, the procedure goes to step S601, if no, the procedure goes to step S605.

In step S605, the position determining module 13 determines that the new intermediate position is the current position of the mobile device 2.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A wireless network access device for positioning a mobile device, comprising:
    a distance acquiring module configured to acquire an initial distance between the wireless network access device and the mobile device in an initial position, and an intermediate distance between the wireless network access device and the mobile device in an intermediate position;
    an information receiving module configured to receive a distance, angle and orientation of a movement of the mobile device from the initial position to the intermediate position; and
    a position determining module configured to retrieve a plurality of initial positions which satisfy an initial condition that a distance between the wireless network access device and any one of the plurality of initial positions equals to the initial distance to determine a plurality of intermediate positions which satisfy an intermediate condition that a distance between the initial position and the intermediate position equals to the distance received by the information receiving module, an angle from a horizontal line to a line which is formed by connecting the initial position and the intermediate position equals to the angle received by the information receiving module, an orientation from the initial position to the intermediate position is the same as the orientation received by the information receiving module, and a distance between the wireless network access device and the intermediate position equals to the intermediate distance acquired by the distance acquiring module;
    wherein the position determining module is further configured to determine whether the number of the plurality of intermediate positions is more than one;
    wherein the position determining module is further configured to take the plurality of intermediate positions as initial positions to determine a plurality of new intermediate positions which satisfy the intermediate condition when the number of the plurality of intermediate positions is more than one, and determine whether the number of the plurality of new intermediate positions is more than one; and
    wherein the position determining module is further configured to determine that the new intermediate position is a current position of the mobile device when the number of the plurality of new intermediate positions is equal to one.

2. The wireless network access device as described in claim 1, wherein the wireless network access device is a wireless router.

3. The wireless network access device as described in claim 1, wherein the distance acquiring module is configured to determine the initial distance or the intermediate between the wireless network access device and the mobile device according to a received signal strengthen from mobile device.

4. A method for positioning a mobile device implemented by a wireless network access device, the method comprising:
    acquiring an initial distance between the wireless network access device and the mobile device in an initial position, and an intermediate distance between the wireless network access device and the mobile device in an intermediate position;
    receiving a distance, angle and orientation of a movement of the mobile device from the initial position to the intermediate position;
    retrieve a plurality of initial positions which satisfy an initial condition that a distance between the wireless network access device and any one of the plurality of initial positions equals to the initial distance to determine a plurality of intermediate positions which satisfy an intermediate condition that a distance between the initial position and the intermediate position equals to the received distance, an angle from a horizontal line to a line which is formed by connecting the initial position and the intermediate position equals to the received angle, an orientation from the initial position to the intermediate position is the same as the received orientation, and a distance between the wireless network access device and the intermediate position equals to the acquired intermediate distance;
    determining whether the number of the plurality of intermediate positions is more than one;
    taking the plurality of intermediate positions as the initial positions to retrieve to determine a plurality of new intermediate positions which satisfy the intermediate condition when the number of the plurality of intermediate positions is more than one, and determining whether the number of the plurality of new intermediate positions is more than one; and
    determining that the new intermediate position is a current position of the mobile device when the number of the plurality of new intermediate positions is equal to one.

5. The method as described in claim 4, further comprising:
    determining the initial distance or the intermediate distance between the wireless network access device and the mobile device according to a received signal strengthen from mobile device.

* * * * *